(12) United States Patent
Zenteno Sánchez

(10) Patent No.: US 9,481,401 B2
(45) Date of Patent: Nov. 1, 2016

(54) ADJUSTABLE AND FLEXIBLE DAMPER STRUCTURE FOR INSTRUMENT CLUSTERS

(71) Applicant: Continental Automotive Systems, Inc., Auburn Hills, MI (US)

(72) Inventor: Claudio César Zenteno Sánchez, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/273,742

(22) Filed: May 9, 2014

(65) Prior Publication Data
US 2015/0321702 A1     Nov. 12, 2015

(51) Int. Cl.
| | |
|---|---|
| *B62D 25/14* | (2006.01) |
| *B62D 27/04* | (2006.01) |
| *F16F 15/02* | (2006.01) |
| *B62D 65/14* | (2006.01) |
| *B60K 37/00* | (2006.01) |
| *F16F 13/20* | (2006.01) |

(Continued)

(52) U.S. Cl.
CPC ............... *B62D 27/04* (2013.01); *B60K 37/00* (2013.01); *B60K 37/02* (2013.01); *B62D 25/14* (2013.01); *B62D 65/14* (2013.01); *F16F 1/371* (2013.01); *F16F 1/377* (2013.01); *F16F 9/04* (2013.01); *F16F 13/20* (2013.01); *F16F 15/022* (2013.01); *F16F 15/04* (2013.01); *Y10T 29/49828* (2015.01)

(58) Field of Classification Search
CPC ..................... E05Y 2201/21; E05Y 2201/254; E05Y 2201/266; E05F 5/02; E05F 5/10; C04B 18/02; C04B 26/122; C04B 40/0259; C04B 40/0263; F16H 2045/021

USPC ................................................. 296/72, 37.12
See application file for complete search history.

(56) References Cited

U.S. PATENT DOCUMENTS

| | | | | |
|---|---|---|---|---|
| 5,174,621 A | * | 12/1992 | Anderson | B60K 37/02 180/90 |
| 5,259,655 A | * | 11/1993 | Anderson | B60K 37/02 180/90 |

(Continued)

FOREIGN PATENT DOCUMENTS

EP        1288058 B1      7/2008

OTHER PUBLICATIONS

Stephen, Regenold, Gear Review—KOR ONE Hydration Vessel, http://gearjunkie.com/gear-review-kor-one-hydration-vessel.

(Continued)

*Primary Examiner* — Kiran B Patel

(57) ABSTRACT

Damping structure provides damping between a first component and a second component of an instrument cluster of a vehicle. The damping structure includes a resilient and flexible damper having a body with first and second opposing ends. The first end is closed and the second end is open to communicate with a generally cylindrical recess in the body. A holding member is coupled to and extends from the first component. The holding member includes a body having a recess therein. At least a portion of the body of the holding member is received in the recess of the damper, with the closed end of the damper covering the recess in the body of the holding member so as to trap air therein. When the first component is coupled to the second component, the closed end of the damper engages the second component so that the damper is under compression loading.

20 Claims, 6 Drawing Sheets

(51) Int. Cl.
  *F16F 15/04*   (2006.01)
  *F16F 1/371*   (2006.01)
  *F16F 1/377*   (2006.01)
  *F16F 9/04*    (2006.01)
  *B60K 37/02*   (2006.01)

(56) References Cited

U.S. PATENT DOCUMENTS

| | | | | |
|---|---|---|---|---|
| 5,824,949 | A | * | 10/1998 | Schach ............... B60K 35/00 174/378 |
| 5,964,672 | A | * | 10/1999 | Bianchi ............... A63B 49/08 473/520 |
| 6,502,888 | B2 | | 1/2003 | Inoue et al. |
| 6,669,309 | B1 | * | 12/2003 | Gierer ................. F16L 55/05 138/30 |
| 6,846,031 | B2 | * | 1/2005 | Pandura ............... B60K 37/02 180/90 |
| 6,968,929 | B2 | * | 11/2005 | Doornbos ............. F16F 9/12 188/290 |
| 7,325,852 | B1 | * | 2/2008 | Coon ................... B60K 37/02 180/90 |
| 7,350,629 | B2 | * | 4/2008 | Anton .................. E05F 5/00 188/82.1 |
| 8,109,424 | B2 | * | 2/2012 | Lee ..................... B60R 7/04 224/281 |
| 8,141,759 | B2 | * | 3/2012 | Lota ................... B60R 7/06 220/827 |
| 2002/0014788 | A1 | * | 2/2002 | Fujita .................. B60K 37/00 296/192 |
| 2009/0122404 | A1 | | 5/2009 | Sneek |
| 2015/0176320 | A1 | * | 6/2015 | Nakasone ............. F16F 1/128 16/85 |

OTHER PUBLICATIONS

KOR Water: The Best Reusable BPA-Free Water Bottles, http://www.korwater.com/.
Glass Water Bottle—Ice Blue, 16 fl oz | Starbucks® Store, http://www.starbucksstore.com/glass-water-bottle-ice-blue-16-fl-oz/011010799,default,pd.html.

* cited by examiner

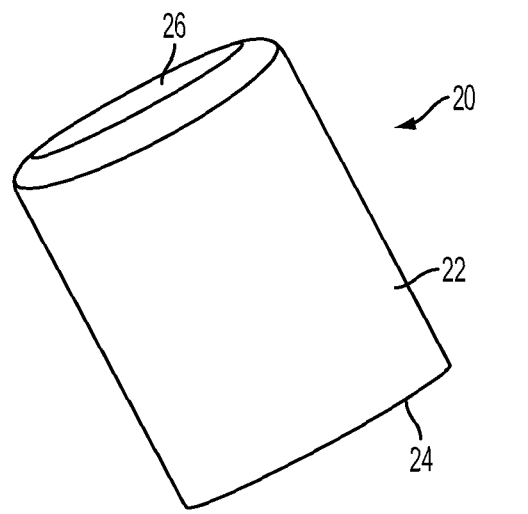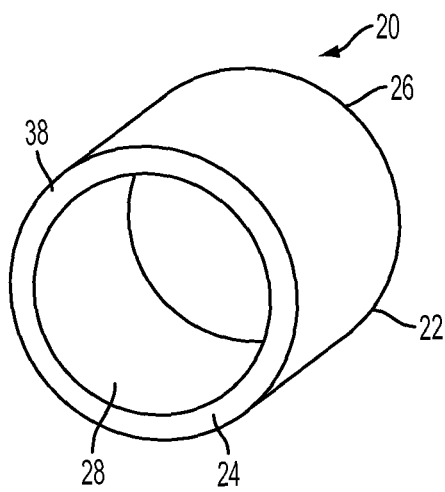
FIG. 4A          FIG. 4B
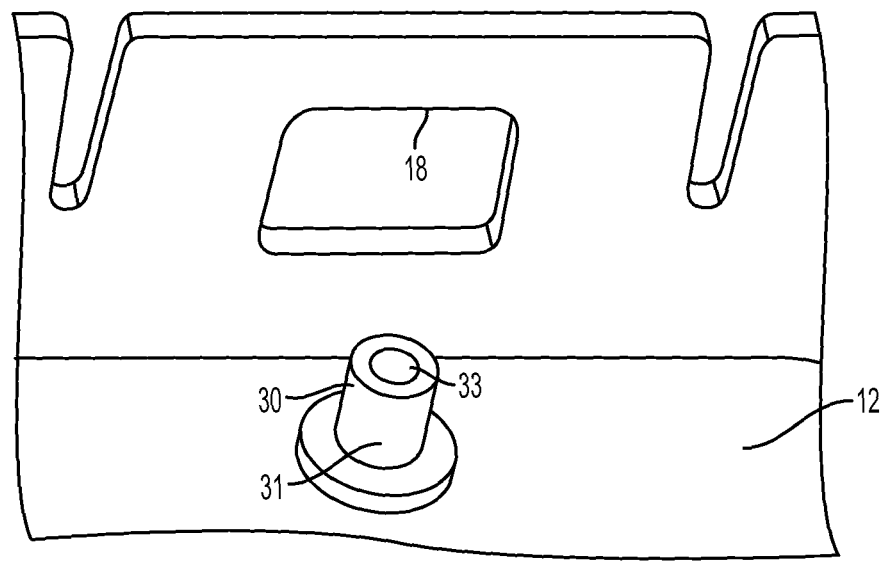
FIG. 5

ADJUSTABLE AND FLEXIBLE DAMPER STRUCTURE FOR INSTRUMENT CLUSTERS

FIELD

The invention relates to instrument clusters for vehicles and, more particularly, to damper structure for reducing noise when two or more parts of the instrument cluster are coupled together.

BACKGROUND

Conventional instrument clusters for vehicles typically include a mask coupled to a light housing by a latching connection. Such a connection may generate noticeable noise in the instrument cluster upon experiencing heat or vibration energy as a consequence of external energy or forces applied to the instrument cluster.

Thus, there is a need to provide adjustable, flexible damper structure between two components of an instrument cluster that are latched together to reduce noise.

SUMMARY

An objective of the invention is to fulfill the need referred to above. In accordance with the principles of the present invention, this objective is obtained by providing damping structure that provides damping between a first component and a second component of an instrument cluster of a vehicle. The damping structure includes a resilient and flexible damper having a body with first and second opposing ends. The first end is closed and the second end is open to communicate with a generally cylindrical recess in the body. A holding member is coupled to and extends from the first component. The holding member includes a body having a recess therein. At least a portion of the body of the holding member is received in the recess of the damper, with the closed end of the damper covering the recess in the body of the holding member so as to trap air therein. When the first component is coupled to the second component, the closed end of the damper engages the second component so that the damper is under compression loading.

In accordance with another aspect of an embodiment, an instrument cluster for a vehicle includes a mask and a housing coupled to the mask via a plurality of latch connections. Damping structure includes a resilient and flexible damper having a body with first and second opposing ends, the first end being closed and the second end being open to communicate with a generally cylindrical recess in the body, and a holding member coupled to and extending from the mask. The holding member includes a body having a recess therein. At least a portion of the body of the holding member is received in the recess of the damper, with the closed end of the damper covering the recess in the body of the holding member so as to trap air therein. The closed end of the damper engages the housing so that the damper is under compression loading.

In accordance with another aspect of an embodiment, a method of providing damping between first and second components of an instrument cluster of a vehicle provides a plurality of holding members coupled to and extending from the first component, each holding member including a body having a recess therein. A plurality of resilient and flexible dampers are provided with each damper having a body with first and second opposing ends, the first end being closed and the second end being open to communicate with a generally cylindrical recess in the body of the damper. Each damper is coupled to an associated holding member, with at least a portion of the body of the holding member being received in the recess of the associated damper and with the closed end of the damper covering the recess in the body of the holding member so as to trap air therein. The first component is coupled to the second component with the dampers sandwiched there-between under compression loading.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 4A is a side perspective view of a damper of damper structure employed in the instrument cluster of FIG. 1.

FIG. 4B is a bottom perspective view of a damper of FIG. 4A.

FIG. 5 is a view of a post of the damper structure employed in the instrument cluster of FIG. 1.

DETAILED DESCRIPTION OF EXEMPLARY EMBODIMENTS

Figure 1:
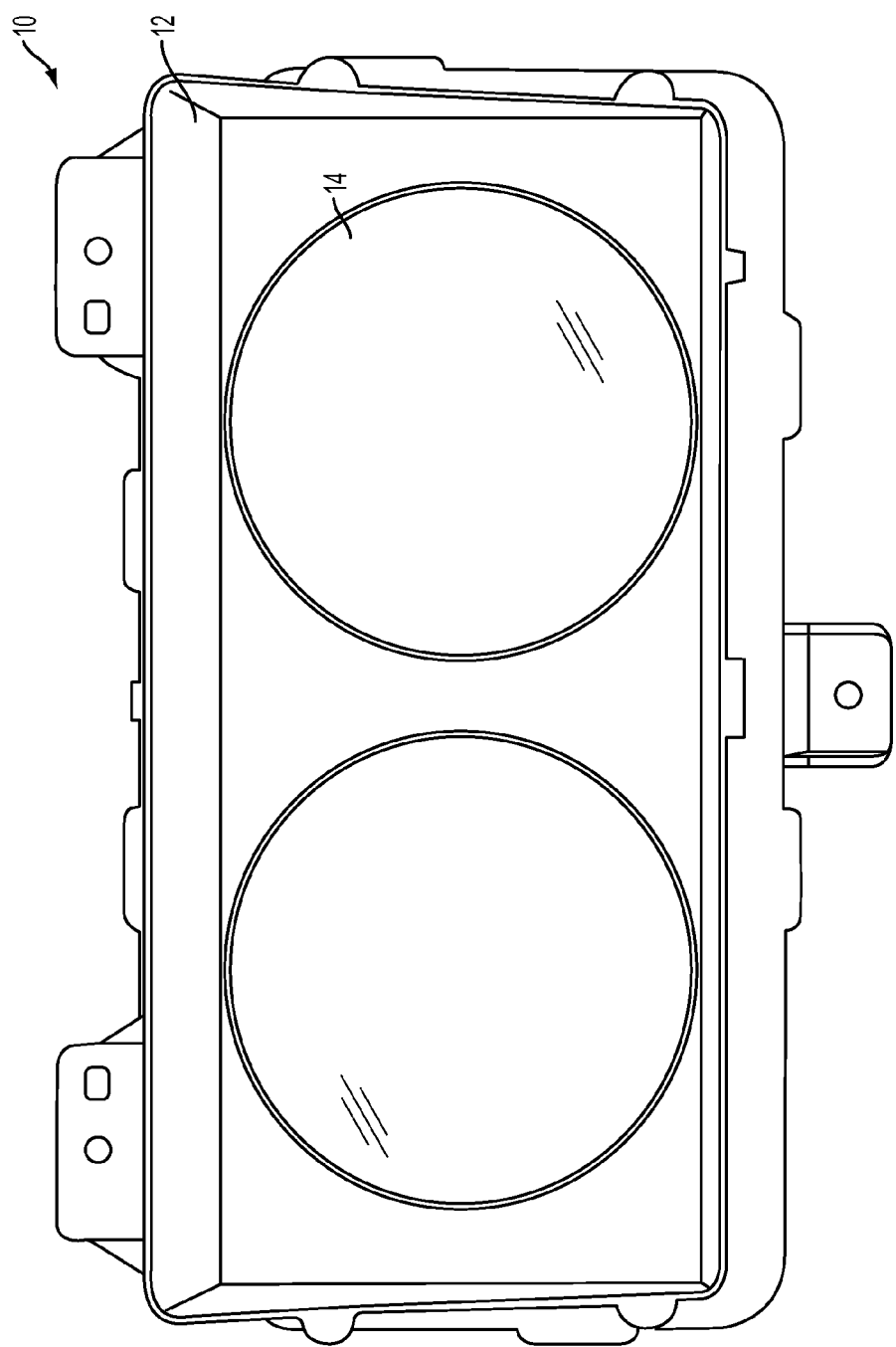
FIG. 1 is a front view of an instrument cluster for a vehicle in accordance with an embodiment.
Figure 2:
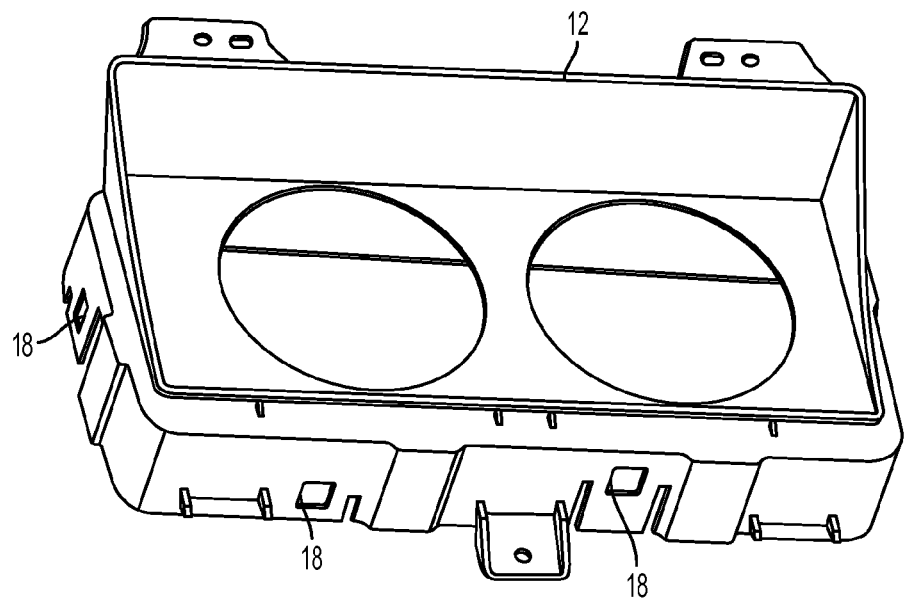
FIG. 2 is a front perspective view of a mask of the instrument cluster of FIG. 1.
Figure 3:
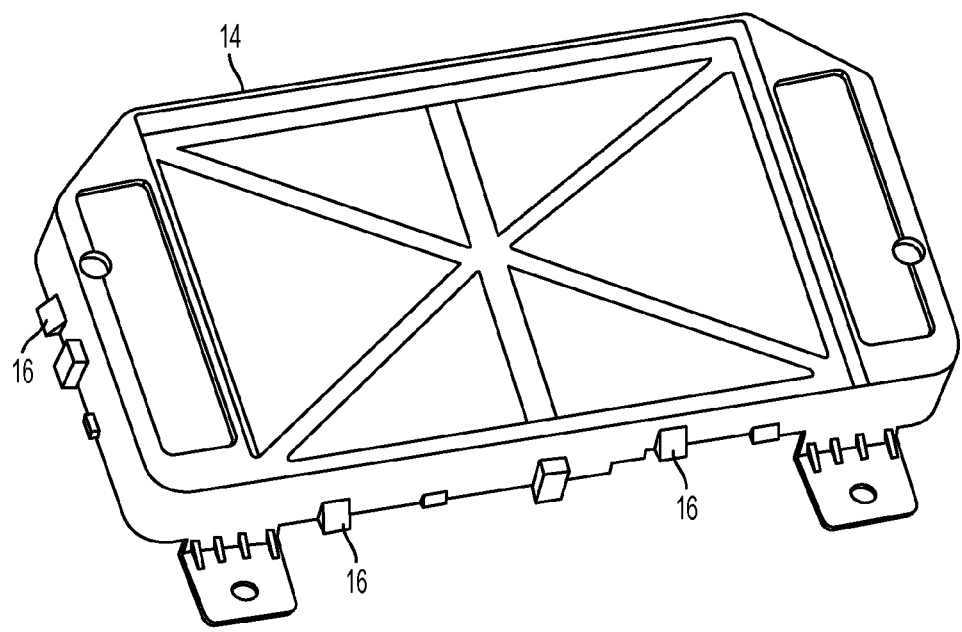
FIG. 3 is a front perspective view of a light housing of the instrument cluster of FIG. 1.

With reference to FIGS. 1-3, an instrument cluster for a vehicle is shown, generally indicated at 10. The instrument cluster 10 includes a first component, such as a mask 12 and a second component 14, such as a light housing, coupled to the mask 12. In the embodiment, the mask 12 is coupled to the housing 14 by latch connections, with resilient tabs 16 on the housing 14 engaged in openings 18 in the mask 12 in the conventional manner. It can be appreciated that the tabs 16 can be on the mask 12 with the openings 18 provided in the housing 14 if desired.

With reference to FIGS. 4A and 4B, a resilient and flexible damper is shown generally indicated at 20. The damper 20 is preferably made from silicone rubber or any viscoelastic material. The damper 20 includes a generally cylindrical body 22 having opposing ends 24 and 26. End 26 is closed and end 24 is open to communicate with a generally cylindrical recess 28 in the body 22. The recess 28 is received by a holding member in the form of a post 30 that extends from the mask 12 (FIG. 5). Thus, the post 30 has a generally cylindrical body 31 with outer diameter that is less than the internal diameter of the recess 28. The post 30 also includes a generally cylindrical recess 33 therein, the function of which will be explained below.

Figure 6:
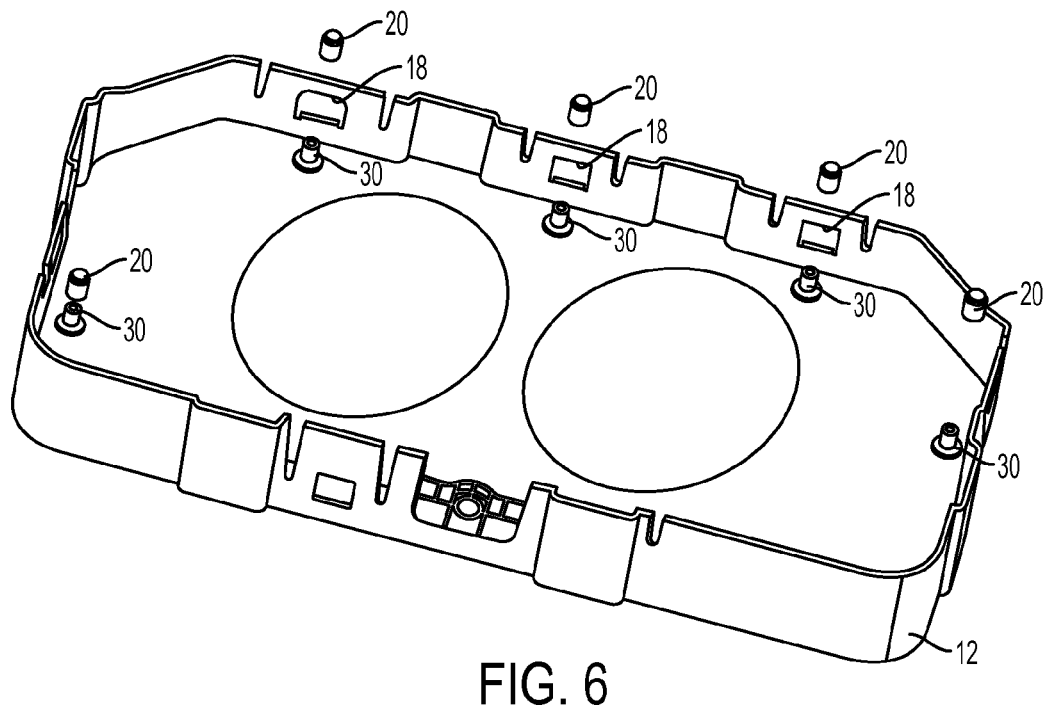
FIG. 6 is a rear perspective view of the mask of the instrument cluster of FIG. 2, shown with the dampers ready to be installed to posts.
Figure 7:
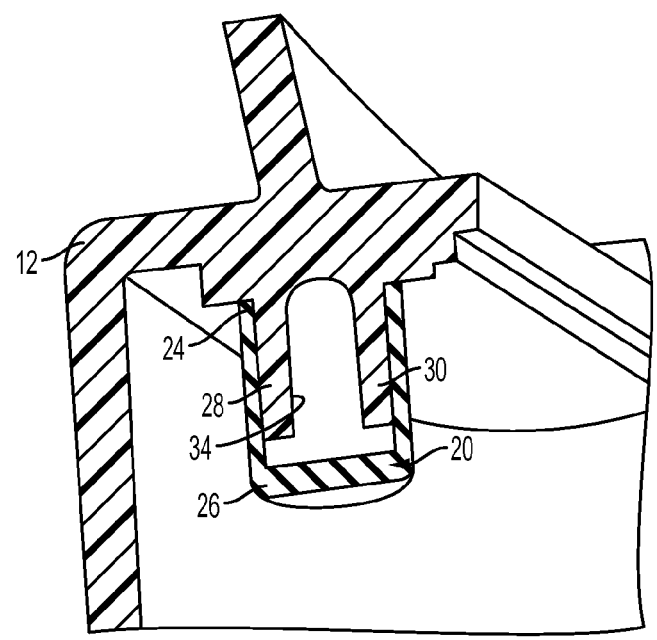
FIG. 7 is a sectional view of a portion of the mask of FIG. 6 shown with the damper structure installed.

As shown in FIG. 6, a plurality of posts 30 extend from bottom surface 32 of the mask 12, preferably adjacent to the openings 18 that receive the tabs 16 of the housing 14. The dampers 20 are also shown in FIG. 6, ready to be coupled to the posts 30. FIG. 7 shows a damper 20 engaged with a generally cylindrical body 31 of a post 30 defining damper structure, generally indicated at 34, in accordance with and embodiment. In particular, the open end 24 of the damper 20 is slid over the body 31 of the post 30 with the outer periphery of the body 31 being received in the recess 28 of the damper 20. The closed end 26 of the damper 20 covers a recess 33 defined in the body 31 of the post 30. Thus, a plurality of damper structures 34 may be provided at desired locations, preferably near the latch connections 16, 18, in the illumination cluster 10 to provide a damping function between the mask 12 and housing 14.

Figure 8:
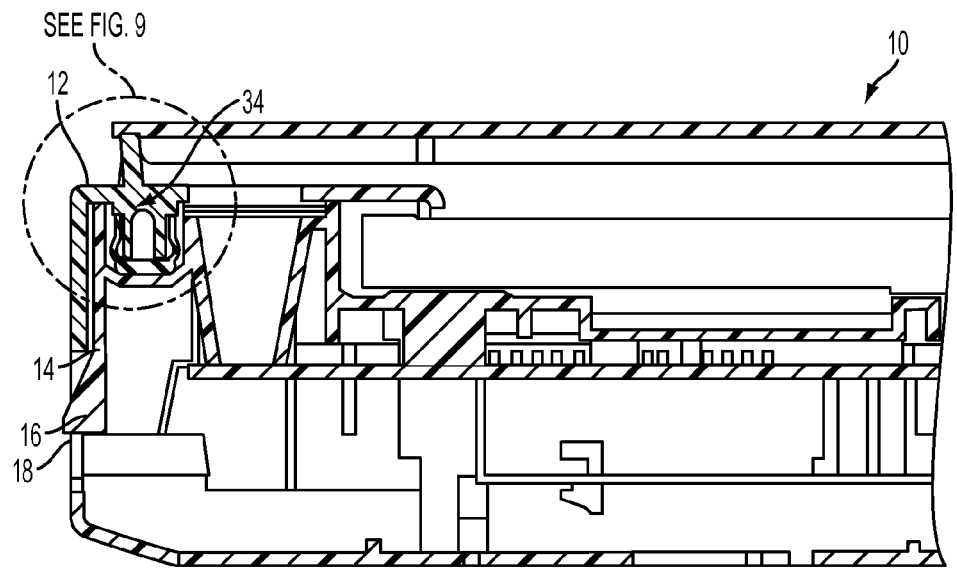
FIG. 8 is a top sectional view of the instrument cluster of FIG. 1 showing the damper structure between the mask and the light housing.
Figure 9:
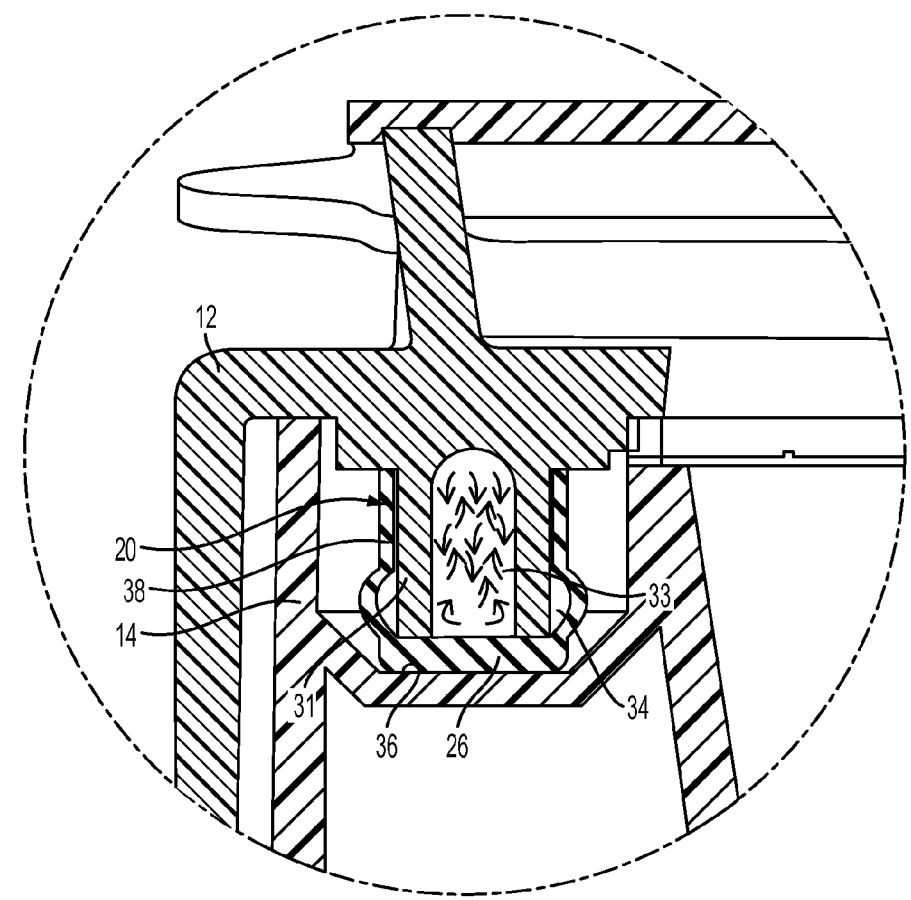
FIG. 9 is an enlarged view of the portion encircled at 9 in FIG. 8.

FIGS. 8 and 9 show the damper structure 34 engaged between the masks 12 and the housing 14 of the instrument cluster 10. As best shown in FIG. 9, the housing 14 has a surface 36 engaging the closed end 26 of the damper 20. When the damper 20 is sandwiched between the mask 12 and the housing 14, it is under compression loading. Thus, sidewall 38 of the damper 20 is permitted to buckle providing adjustment of the damper 20. Air is trapped in the recess 33 of the body 31 of post 30 and the viscoelastic material of the end 26 of the damper 20 provides a damping function. Under loading conditions, the damping structure 34 will decrease loading reaction and noise.

Figure 10A:
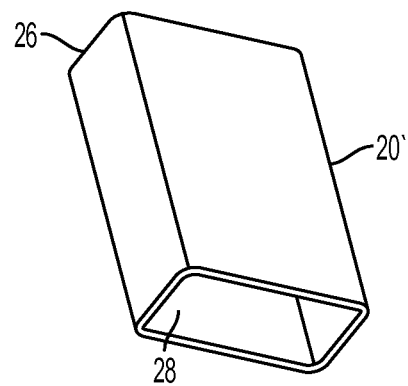
FIG. 10A is a view of a damper provided in accordance with another embodiment.
Figure 10B:
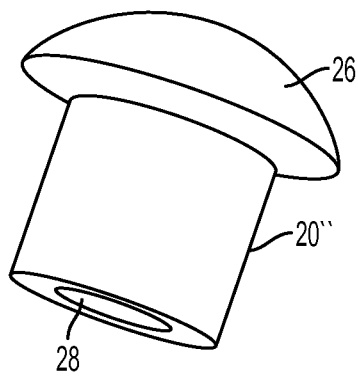
FIG. 10B is a view of a damper provided in accordance with yet another embodiment.
Figure 10C:
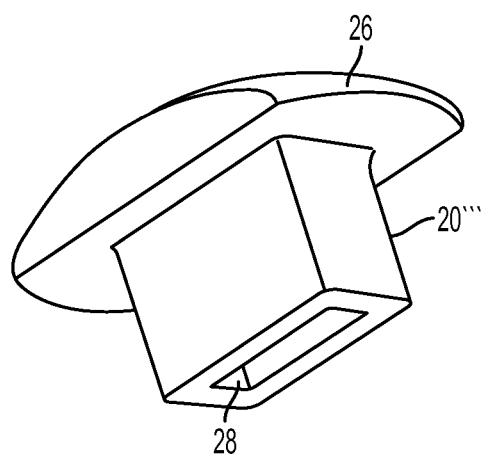
FIG. 10C is a view of a damper provided in accordance with a further embodiment.

FIGS. 10A-10C show various alternative embodiments of the damper 20. For example the damper 20' of FIG. 10, has an end 26 of generally rectangular shape, the damper 20" of FIG. 10B has an end 26 of generally circular shape, and the damper 20''' of FIG. 10C has an end 26 of generally conical shape. The shape of the dampers depends on specific performance, latching geometry, latching location in the cluster 10 and cluster mass distribution. It can be appreciated that the shape of the post 30 would be modified to correspond with the shape of the recess 28 in the damper so that the post can be received in the recess 28.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. Damping structure providing damping between a first component and a second component of an instrument cluster of a vehicle, the damping structure comprising:
   a resilient and flexible damper having a body with first and second opposing ends, the first end being closed and the second end being open to communicate with a generally cylindrical recess in the body, and
   a holding member coupled to and extending from the first component, the holding member including a body having a recess therein, at least a portion of the body of the holding member being received in the recess of the damper, with the closed end of the damper covering the recess in the body of the holding member so as to trap air therein,
   wherein, when the first component is coupled to the second component, the closed end of the damper engages the second component so that the damper is under compression loading.

2. The damping structure of claim 1, wherein the damper is made from viscoelastic material.

3. The damping structure of claim 2, wherein the material is silicone rubber.

4. The damping structure of claim 1, wherein each of the body and recess of the damper is generally cylindrical and the body of the housing member is generally cylindrical.

5. The damping structure of claim 1, in combination with the first and second components, wherein the first component is a mask of the instrument cluster and the second component is a housing of the instrument cluster.

6. The combination of claim 5, wherein the mask and housing are coupled together using latch connections, each latch connection including a tab on the mask or housing that is received in an opening in the other of the mask or housing.

7. The combination of claim 6, wherein a plurality of damping structures are provided with at least one damping structure being located generally adjacent to a latch connection.

8. The combination of claim 6, wherein the housing includes a surface engaged by the closed end of the damper causing compression of the damper.

9. An instrument cluster comprising:
   a mask,
   a housing coupled to the mask via a plurality of latch connections, and
   damping structure comprising:
      a resilient and flexible damper having a body with first and second opposing ends, the first end being closed and the second end being open to communicate with a generally cylindrical recess in the body, and
      a holding member coupled to and extending from the mask, the holding member including a body having a recess therein, at least a portion of the body of the holding member being received in the recess of the damper, with the closed end of the damper covering the recess in the body of the holding member so as to trap air therein,
   wherein, the closed end of the damper engages the housing so that the damper is under compression loading.

10. The instrument cluster of claim 9, wherein the damper is made from viscoelastic material.

11. The instrument cluster of claim 10, wherein the material is silicone rubber.

12. The instrument cluster of claim 9, wherein each of the body and recess of the damper is generally cylindrical and the body of the housing member is generally cylindrical.

13. The instrument cluster of claim 9, wherein each latch connection includes a tab on the housing that is received in an opening in the mask.

14. The instrument cluster of claim 13, wherein a plurality of damping structures are provided with at least one damping structure being located generally adjacent to a latch connection.

15. The instrument cluster of claim 9, wherein the housing includes a surface engaged by the closed end of the damper causing compression of the damper.

16. A method of providing damping between first and second components of an instrument cluster of a vehicle, the method comprising steps of:

providing a plurality of holding members coupled to and extending from the first component, each holding member including a body having a recess therein, providing a plurality of resilient and flexible dampers each having a body with first and second opposing ends, the first end being closed and the second end being open to communicate with a generally cylindrical recess in the body of the damper, coupling each damper to an associated holding member, with at least a portion of the body of the holding member being received in the recess of the associated damper and with the closed end of the damper covering the recess in the body of the holding member so as to trap air therein, and coupling the first component to the second component with the dampers sandwiched there-between under compression loading.

17. The method of claim 16, wherein the first component is a mask of the instrument cluster and the second component is a housing of the instrument cluster and wherein the coupling step includes the use of latch connections, each latch connection including a tab on the mask or housing that is received in an opening in the other of the mask or housing.

18. The method of claim 17, wherein at least one a holding member and an associated damper is provided generally adjacent to a latch connection.

19. The method of claim 16, further including providing a surface in the housing that is engaged by the closed end of the damper causing compression of the damper.

20. The method of claim 16, wherein each damper is provided from viscoelastic material.

* * * * *